(12) United States Patent
Sekiguchi

(10) Patent No.: US 7,478,755 B2
(45) Date of Patent: Jan. 20, 2009

(54) COMMUNICATION SYSTEM, COMMUNICATION APPARATUS AND METHOD, RECORDING MEDIUM, AND PROGRAM

(75) Inventor: Hiroshi Sekiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 322 days.

(21) Appl. No.: 11/370,856

(22) Filed: Mar. 9, 2006

(65) Prior Publication Data

US 2006/0208088 A1 Sep. 21, 2006

(30) Foreign Application Priority Data

Mar. 16, 2005 (JP) ............... 2005-075170

(51) Int. Cl.
*G03B 7/08* (2006.01)
*G06K 5/00* (2006.01)
*G06K 7/10* (2006.01)
*G06K 7/14* (2006.01)

(52) U.S. Cl. ............... 235/462.24; 235/462.41; 235/462.1

(58) Field of Classification Search ............ 235/462.24, 235/462.25, 462.1, 462.45, 470, 462.46
See application file for complete search history.

(56) References Cited

U.S. PATENT DOCUMENTS

| 7,150,400 | B2 * | 12/2006 | Melick et al. | ......... 235/462.25 |
| 7,328,848 | B2 * | 2/2008 | Xia et al. | ......... 235/462.11 |
| 2001/0013025 | A1 * | 8/2001 | Ananda | ......... 705/60 |
| 2005/0083413 | A1 * | 4/2005 | Reed et al. | ......... 348/211.99 |
| 2005/0120096 | A1 * | 6/2005 | Rekimoto et al. | ......... 709/220 |
| 2005/0199699 | A1 * | 9/2005 | Sato et al. | ......... 235/375 |
| 2006/0085271 | A1 * | 4/2006 | Tokita et al. | ......... 705/26 |
| 2006/0267753 | A1 * | 11/2006 | Hussey et al. | ......... 340/505 |

FOREIGN PATENT DOCUMENTS

| JP | 2001-189722 | 7/2001 |
| JP | 2003-169187 | 6/2003 |
| JP | 2004-178187 | 6/2004 |
| JP | 2004-274520 | 9/2004 |
| JP | 2006-157815 | 6/2006 |

* cited by examiner

*Primary Examiner*—Edwyn Labaze
(74) *Attorney, Agent, or Firm*—Oblon, Spivak, McClelland, Maier & Neustadt, P.C.

(57) ABSTRACT

A communication system includes a first communication apparatus; and a second communication apparatus, wherein the first communication apparatus and the second communication apparatus communicate with each other by wireless. The first communication apparatus includes a first storage device for storing configuration information for rejecting unauthorized connection and for connecting only an authorized party, an encoding device for encoding the stored configuration information into two-dimensional codes, and a display control device for controlling display of the two-dimensional codes. The second communication apparatus includes an image-capture control device for controlling image capture of the displayed two-dimensional codes, a decoding device for decoding the image-captured two-dimensional codes into the configuration information, and a second storage device for storing the decoded configuration information.

14 Claims, 9 Drawing Sheets

| HEADER | |
|---|---|
| IDENTIFICATION CODE | MAC ADDRESS |
| IDENTIFICATION CODE | SSID |
| IDENTIFICATION CODE | WEP KEY |

COMMUNICATION SYSTEM, COMMUNICATION APPARATUS AND METHOD, RECORDING MEDIUM, AND PROGRAM

CROSS REFERENCES TO RELATED APPLICATIONS

The present invention contains subject matter related to Japanese Patent Application JP 2005-075170 filed in the Japanese Patent Office on Mar. 16, 2005, the entire contents of which are incorporated herein by reference.

BACKGROUND OF THE INVENTION

1. Field of the Invention

The present invention relates to a communication system, a communication apparatus and method, a recording medium, and a program. More particularly, the present invention relates to a communication system capable of easily setting a wireless communication, a communication apparatus and method for use therewith, a recording medium for use therewith, and a program for use therewith.

2. Description of the Related Art

In recent years, as network technology has become popular, even for apparatuses other than personal computers, the form in which they are connected to a network and are used has become widespread. Furthermore, as a technology for realizing a network, in so-called physical layers, in addition to a network using wired communication in compliance with a standard such as the Ethernet (registered trademark), a network using a wireless connection has become common.

As a standard for a so-called wireless LAN (Local Area Network), which is a network using wireless communication, at present, a wireless LAN in compliance with the IEEE (The Institute of Electrical and Electronic Engineers, Inc.) 802.11 standard has been generally used.

For the wireless LAN, there are known an infrastructure method for enabling a relay station for the wireless LAN, which is called an access point, and apparatuses called stations, to communicate with one another, and an ad-hoc method in which access points are not used and stations directly communicate with one another. The infrastructure method is generally used.

In the standard of the wireless LAN, the setting of apparatuses when the apparatuses are connected to the wireless LAN is specified. In order to perform communication of the wireless LAN by the infrastructure method, settings of an SSID (Service Set ID) and WEP (Wired Equivalent Privacy) need to match between the access point and the station that is connected to a wireless LAN segment (component units of the LAN) in which the access point is a relay station.

Here, the SSID is an identifier for specifying a specific network in the wireless LAN. In a station that is connected to an access point and a wireless LAN segment in which that access point is a relay station, a common character string is specified as an SSID. The WEP refers to a function for encrypting data to be communicated by an encryption method employing a so-called common key encryption method in which the same key (encryption key) is set in both the access point and the station. As a result of setting a key for WEP (hereinafter referred to as a "WEP key"), not only can data (packets) during communication be encrypted, but also the WEP key can be used for access restriction because it is difficult to connect a station in which the WEP key is not correctly set to the access point.

That is, in a wireless LAN of an infrastructure method, by setting an SSID and a WEP key to be identical to those of the access point with respect to a station that is to be connected to a wireless LAN, communication with another station via an access point can be performed.

Furthermore, in bar codes for setting purposes capable of changing desired setting items on the operation of an optical information reading apparatus by being scanned by the optical information reading apparatus, there are setting bar codes of an optical information reading apparatus for recording a difference between an initial value and a changed value of each setting item (refer to, for example, Japanese Unexamined Patent Application Publication No. 2002-366883).

SUMMARY OF THE INVENTION

However, when a network in each apparatus is to be set, a method of individually inputting various kinds of setting items, such as an SSID and a WEP key, by a manual operation by using a personal computer or the like is typically used. Therefore, problems arise in that setting is not possible if there is no personal computer available during setting and it is difficult for those other than a user having knowledge about networks to easily perform setting.

When a consumer apparatus such as a digital still camera (digital camera) is to be connected as a station to a wireless LAN, in the case of an apparatus not having highly functional input means such as a keyboard when various kinds of settings are performed on the main unit of the apparatus, operation during setting become complex. Furthermore, there is a possibility that a user not having expertise knowledge about networks does not know how to perform a setting.

For example, an optical information reading apparatus disclosed in Japanese Unexamined Patent Application Publication No. 2002-366883 sets desired setting items on operation by reading setting bar codes in which the difference between an initial value and a changed value of each setting item is recorded. However, since, after setting bar codes are printed using a personal computer or the like, the printed bar codes are read, an apparatus having a printing function becomes necessary, and the operation for printing the setting bar codes becomes troublesome.

Furthermore, in each apparatus, when setting is performed to make a connection to the wireless LAN, the apparatus wirelessly transmits various kinds of configuration information using radio waves via the wireless LAN. As a consequence, there is a possibility that those pieces of configuration information are intercepted.

The present invention has been made in view of such circumstances. It is desirable to be capable of performing communication setting more simply and more safely.

According to an embodiment of the present invention, there is provided a communication system. The communication system includes: a first communication apparatus; and a second communication apparatus, wherein the first communication apparatus and the second communication apparatus communicate with each other by wireless, wherein the first communication apparatus includes first storage means for storing configuration information for rejecting unauthorized connection and for connecting only an authorized party, encoding means for encoding the stored configuration information into two-dimensional codes, and display control means for controlling display of the two-dimensional codes, and wherein the second communication apparatus includes image-capture control means for controlling image capture of the displayed two-dimensional codes, decoding means for decoding the image-captured two-dimensional codes into the configuration information, and second storage means for storing the decoded configuration information.

According to another embodiment of the present invention, there is provided a communication apparatus including storage means for storing configuration information for rejecting unauthorized connection and for, connecting only an authorized party; encoding means for encoding the stored configuration information into two-dimensional codes; and display control means for controlling display of the two-dimensional codes.

The communication apparatus may further include generation means for generating the configuration information.

The generation means may generate, as the configuration information, a service set ID (SSID), which is an identifier for specifying a specific network in the wireless communication, and a wired equivalent privacy (WEP) key, which is an encryption key for encrypting data.

The encoding means may encode the stored configuration information into quick response (QR) codes.

The configuration information may be selected as desired and may become a common value on the transmission side and on the reception side.

According to another embodiment of the present invention, there is provided a communication method including the steps of: controlling the storage of configuration information for rejecting unauthorized connection and for connecting only an authorized party; encoding the stored configuration information into two-dimensional codes; and controlling display of the two-dimensional codes.

According to another embodiment of the present invention, there is provided a recording medium having recorded thereon a computer-readable program for performing a wireless communication process, the computer-readable program including the steps of: controlling the storage of configuration information for rejecting unauthorized connection and for connecting only an authorized party; encoding the stored configuration information into two-dimensional codes; and controlling display of the two-dimensional codes.

According to another embodiment of the present invention, there is provided a program including the steps of: controlling the storage of configuration information for rejecting unauthorized connection and for connecting only an authorized party; encoding the stored configuration information into two-dimensional codes; and controlling display of the two-dimensional codes.

According to another embodiment of the present invention, there is provided a communication apparatus for performing a wireless communication, including: image-capture control means for controlling image capture of two-dimensional codes in which configuration information for rejecting displayed unauthorized connection and for connecting only an authorized party is encoded; decoding means for decoding the image-captured two-dimensional codes into the configuration information; and storage means for storing the decoded configuration information.

The decoding means may decode the image-captured QR codes into the configuration information.

According to another embodiment of the present invention, there is provided a communication method including the steps of: controlling image capture of two-dimensional codes in which configuration information for rejecting displayed unauthorized connection and for connecting only an authorized party is encoded; decoding the image-captured two-dimensional codes into the configuration information; and controlling the storage of the decoded configuration information.

According to another embodiment of the present invention, there is provided a recording medium having recorded thereon a computer-readable program including the steps of: controlling image capture of two-dimensional codes in which configuration information for rejecting displayed unauthorized connection and for connecting only an authorized party is encoded; decoding the image-captured two-dimensional codes into the configuration information; and controlling the storage of the decoded configuration information.

According to another embodiment of the present invention, there is provided a program including the steps of: controlling image capture of two-dimensional codes in which configuration information for rejecting displayed unauthorized connection and for connecting only an authorized party is encoded; decoding the image-captured two-dimensional codes into the configuration information; and controlling the storage of the decoded configuration information.

In the communication system according to an embodiment of the present invention, the first communication apparatus stores configuration information for rejecting unauthorized connection and for connecting only an authorized party, encodes the stored configuration information into two-dimensional codes, and controls the display of the two-dimensional codes. The second communication apparatus controls the image capture of the displayed two-dimensional codes, decodes the image-captured two-dimensional codes into the configuration information, and stores the decoded configuration information.

In the communication apparatus and method, the recording medium, and the program according to embodiments of the present invention, configuration information for rejecting unauthorized connection and for connecting only an authorized party may be stored, the stored configuration information may be encoded into two-dimensional codes, and the display of the two-dimensional codes may be controlled.

In the communication apparatus and method, the recording medium, and the program according to embodiments of the present invention, the image capture of two-dimensional codes in which configuration information for rejecting displayed unauthorized connection and for connecting only an authorized party is encoded may be controlled, the image-captured two-dimensional codes may be decoded into the configuration information, and the decoded configuration information may be stored.

DESCRIPTION OF THE PREFERRED EMBODIMENTS

Figure 1:
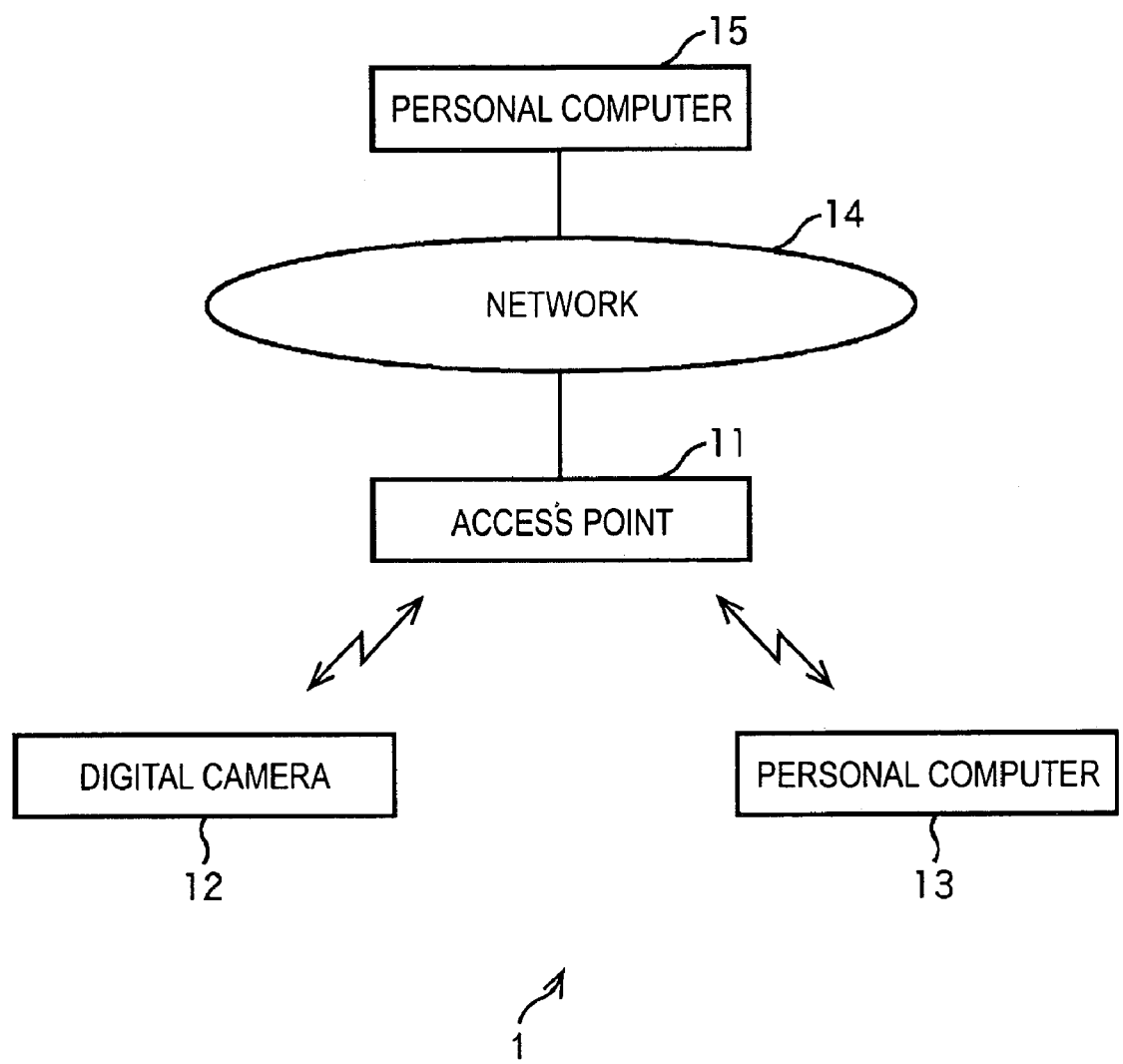
FIG. 1 is a block diagram showing the configuration of a communication system to which an embodiment of the present invention is applied.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

According to an embodiment of the present invention, there is provided a communication system. The communication system (for example, a communication system of FIG. 1) includes: a first communication apparatus (for example, an access point 11 of FIG. 1) including first storage means (for example, a configuration information storage section 26 of FIG. 2) for storing configuration information (for example, configuration information) for rejecting unauthorized connection and for connecting only an authorized party, encoding means (for example, an encoding section 52 of FIG. 2) for encoding the stored configuration information into two-dimensional codes, and display control means (for example, a display control section 53 of FIG. 2) for controlling display of the two-dimensional codes; and a second communication apparatus (for example, a digital camera 12 of FIG. 1) including image-capture control means (for example, an image-capture control section 141 of FIG. 3) for controlling image capture of the displayed two-dimensional codes, decoding means (for example, a decoding section 142 of FIG. 3) for decoding the image-captured two-dimensional codes into the configuration information, and second storage means (for example, a configuration information storage section 107 of FIG. 3) for storing the decoded configuration information.

According to an embodiment of the present invention, there is provided a communication apparatus. The communication apparatus (for example, a access point 11 of FIG. 1) includes: storage means (for example, a configuration information storage section 26 of FIG. 2) for storing configuration information for rejecting unauthorized connection and for connecting only an authorized party; encoding means (for example, an encoding section 52 of FIG. 2) for encoding the stored configuration information into two-dimensional codes; and display control means (for example, a display control section 53 of FIG. 2) for controlling display of the two-dimensional codes.

The communication apparatus may further include generation means (for example, configuration information generation section 51) for generating the configuration information.

The generation means may generate, as the configuration information, a service set ID (SSID), which is an identifier for specifying a specific network in the wireless communication, and a wired equivalent privacy (WEP) key, which is an encryption key for encrypting data.

The encoding means may encode the stored configuration information into quick response (QR) codes.

The configuration information may be selected as desired and may become a common value on the transmission side and on the reception side.

According to another embodiment of the present invention, there is provided a communication method. The communication method includes the steps of: controlling (for example, a process of step S14 of FIG. 5) the storage of configuration information for rejecting unauthorized connection and for connecting only an authorized party; encoding (for example, a process of step S15 of FIG. 5) the stored configuration information into two-dimensional codes; and controlling (for example, a process of step S16 of FIG. 5) the display of the two-dimensional codes.

According to another embodiment of the present invention, there is provided a program. The program includes the steps of: controlling (for example, a process of step S14 of FIG. 5) the storage of configuration information for rejecting unauthorized connection and for connecting only an authorized party; encoding (for example, a process of step S15 of FIG. 5) the stored configuration information into two-dimensional codes; and controlling (for example, a process of step S16 of FIG. 5) the display of the two-dimensional codes.

Figure 2:
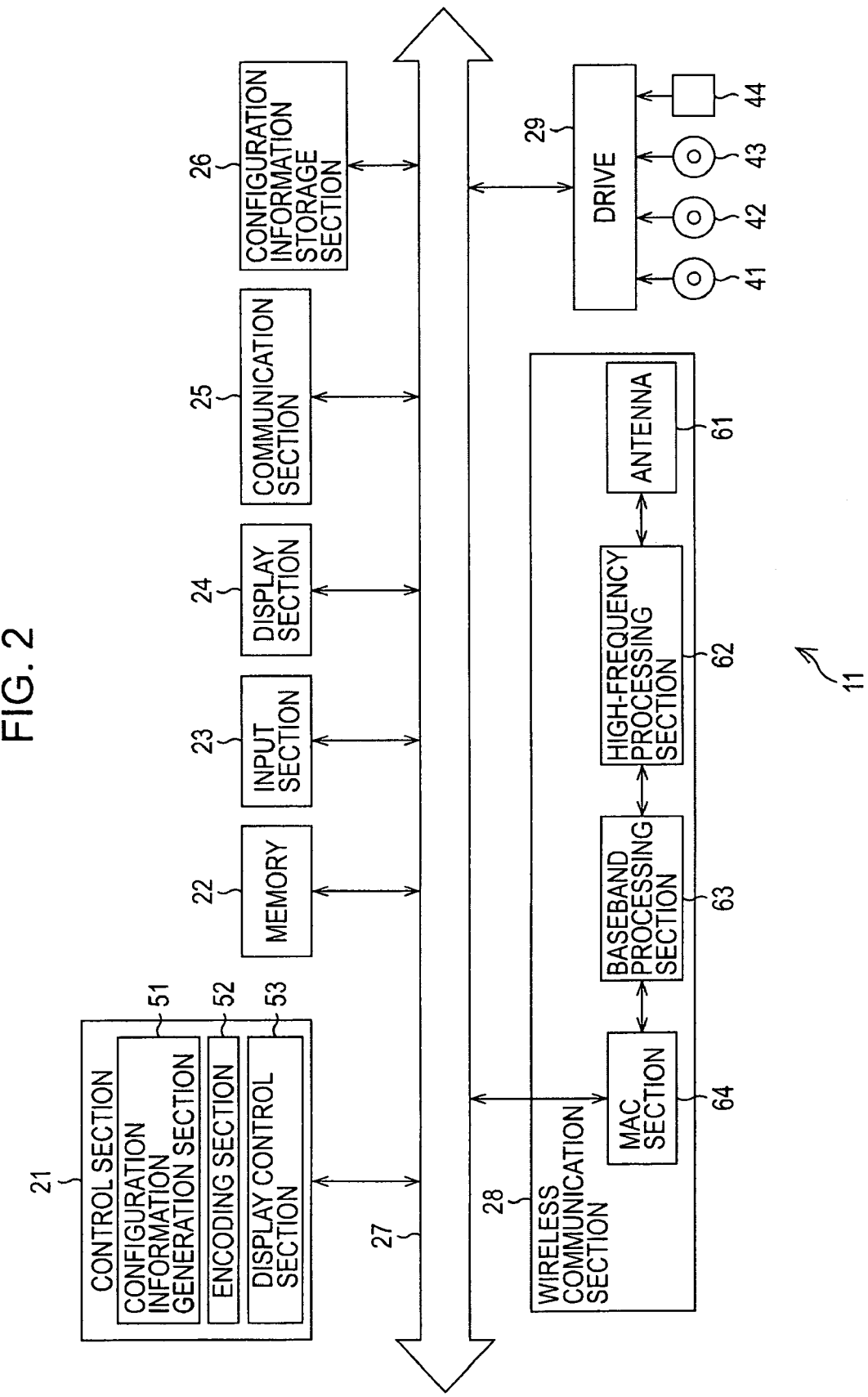
FIG. 2 is a block diagram showing the structure of functions of an access point.

The program may be stored in a storage medium (for example, a magnetic disk 41 of FIG. 2).

According to another embodiment of the present invention, there is provided a communication apparatus. The communication apparatus (for example, a digital camera 12 of FIG. 1) includes: image-capture control means (for example, an image-capture control section 141 of FIG. 3) for controlling image capture of two-dimensional codes in which configuration information for rejecting displayed unauthorized connection and for connecting only an authorized party is encoded; decoding means (for example, a decoding section 142 of FIG. 3) for decoding the image-captured two-dimensional codes into the configuration information; and storage means (for example, a configuration information storage section 107 of FIG. 3) for storing the decoded configuration information.

The decoding means may decode the image-captured QR codes into the configuration information.

According to another embodiment of the present invention, there is provided a communication method. The communication method includes the steps of: controlling (for example, a process of step S33 of FIG. 8) the image capture of two-dimensional codes in which configuration information for rejecting displayed unauthorized connection and for connecting only an authorized party is encoded; decoding (for example, a process of step S34 of FIG. 8) the image-captured two-dimensional codes into the configuration information; and controlling (for example, a process of step S35 of FIG. 8) the storage of the decoded configuration information.

According to another embodiment of the present invention, there is provided a program. The program includes the steps of: controlling (for example, a process of step S33 of FIG. 8) the image capture of two-dimensional codes in which configuration information for rejecting displayed unauthorized connection and for connecting only an authorized party is encoded; decoding (for example, a process of step S34 of FIG. 8) the image-captured two-dimensional codes into the configuration information; and controlling (for example, a process of step S35 of FIG. 8) the storage of the decoded configuration information.

Figure 3:
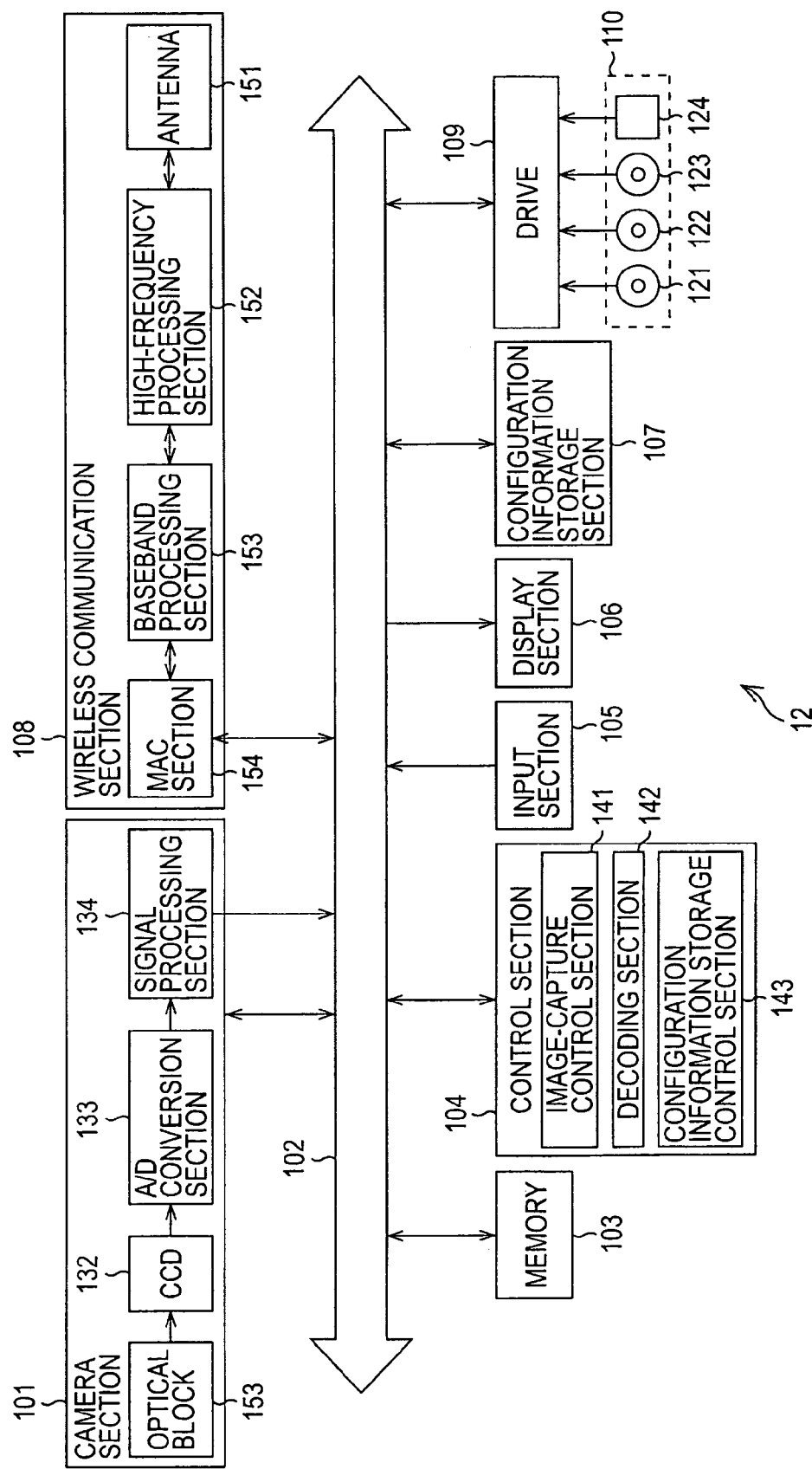
FIG. 3 is a block diagram showing the structure of functions of a digital camera.

The program may be stored on a storage medium (for example, a magnetic disk 121 of FIG. 3).

Embodiments of the present invention will now be described below with reference to the drawings.

FIG. 1 is a block diagram showing the configuration of a communication system 1 to which an embodiment of the present invention is applied. In this communication system 1, a digital camera 12 and a personal computer 13 are connected to an access point 11, and the access point 11 and a personal computer 15 are connected to a network 14.

The access point 11 is an example of a communication device for relaying data transmitted and received between the digital still camera (hereinafter referred to as a "digital camera") 12 and the personal computer 13 via a wireless LAN of an infrastructure method. For example, the access point 11 relays data transmitted from the digital camera 12 and transmits it to the personal computer 13, or relays data transmitted from the personal computer 13 and transmits it to the digital camera 12.

Furthermore, the access point 11 has a routing (Routing) or NAT (Network Address Translation) function. For example, the access point 11 relays data transmitted from the digital camera 12 or the personal computer 13 and transmits it to the personal computer 15 connected to the network 14, or relays data transmitted from the personal computer 15 connected to the network 14 and transmits it to the digital camera 12 or the personal computer 13.

The digital camera 12 is an example of a communication device having an interface (wireless LAN card) for performing communication via a wireless LAN. For example, the digital camera 12 transmits or receives data to or from the personal computer 13 via the access point 11. Furthermore, the digital camera 12 image captures a subject and records image data obtained as a result of the image capture.

The personal computer 13 is an example of an apparatus for transmitting data to the digital camera 12 via the access point 11 or for receiving data transmitted from the digital camera 12 via the access point 11. For example, the personal computer 13 receives image data captured by the digital camera 12, which is transmitted from the digital camera 12, via the access point 11, and records the received image data.

In the network 14, the access point 11, the personal computer 15, and the like are interconnected to one another. The network 14 is formed of a wireless or wired interconnected network or communication line. The network 14 allows the access point 11 and the personal computer 15 to mutually communicate with each other in accordance with a predetermined protocol, such as a TCP/IP (Transmission Control Protocol/Internet Protocol).

The personal computer 15 is an example of an apparatus for transmitting data to the digital camera 12 via the access point 11 and the network 14 or for receiving data transmitted from the digital camera 12 via the access point 11 and the network 14. For example, the personal computer 15 receives image data captured by the digital camera 12, which is transmitted from the digital camera 12 via the access point 11 and network 14, and records the received image data.

In this embodiment, the digital camera 12 will be described below as an example of a communication device. The present invention is not limited to this example and can be applied to an apparatus having image-capturing functions, such as a camcorder (camera integrated video recorder), a PDA (Personal Digital Assistance), a mobile phone with image-capturing functions, and a personal computer with image-capturing functions.

In the above-described example, to make descriptions easier to understand, the digital camera 12 and the personal computer 13 are described as examples of apparatuses that are connected to the access point 11. The number of apparatuses to be connected can be increased or decreased within the range of the number of apparatuses that can be connected to the access point 11. That is, any number of apparatuses can be connected to the access point 11.

Furthermore, instead of the personal computer 13 or the personal computer 15, an apparatus that can be connected to. the access point 11, such as a digital camera, a camcorder, a PDA, or a mobile phone with image-capturing functions, or to the network 14, may be connected. Furthermore, rather than being connected to the external network 14, the access point 11 can be connected to only the digital camera 12 and the personal computer 13.

FIG. 2 is a block diagram showing the structure of the functions of the access point 11.

A control section 21 is formed of a general-purpose CPU (Central Processing Unit), MPU (Micro Processing Unit), or a dedicated processor, and controls each section of the access point 11. For example, the control section 21, which is a CPU, realizes various kinds of functions by executing a program stored in a memory 22, and controls each section of the access point 11.

Furthermore, the control section 21 supplies data to a memory 22 or obtains data that is temporarily stored by the memory 22 as necessary.

The control section 21 includes a configuration information generation section 51, an encoding section 52, and a display control section 53. For example, the control section 21, which is a CPU for executing a program, realizes the configuration information generation section 51, the encoding section 52, and the display control section 53.

The configuration information generation section 51, the encoding section 52, and the display control section 53 may be formed of hardware, and may also be realized by a computer for executing a program.

The configuration information generation section 51 generates configuration information for rejecting unauthorized connection and connecting only an authorized party. For example, the configuration information generation section 51 generates a random number, such as a binomial random number, a Poisson random number or a normal random number, in accordance with an operation signal supplied from an input section 23, generates an SSID, which is "abcde123", and a WEP key, which is "xyz1359ab", by using the generated random numbers as the SSID and the WEP key, which are examples of the configuration information, and supplies the generated SSID and WEP key to a configuration information storage section 26 and the encoding section 52.

Furthermore, the configuration information generation section 51 generates configuration information that is selected as desired and that is made to be a common value on the transmission side and on the reception side.

The encoding section 52 encodes the SSID and the WEP key supplied from the configuration information generation section 51 into two-dimensional codes. The encoding section 52 supplies the encoded two-dimensional codes to a display control section 53. More specifically, the encoding section 52 encodes the SSID, which is "abcde123", and the WEP key, which is "xyz1359ab", which are supplied from the configuration information generation section 51, into quick response (QR) codes (trademark) as an example of two-dimensional codes, and supplies the encoded QR codes to the display control section 53.

That is, the encoding section 52 generates two-dimensional codes containing the SSID and the WEP key supplied from the configuration information generation section 51.

Here, the two-dimensional codes mean codes having information in the two-dimensional direction, that is, in the horizontal and vertical directions. For example, unlike one-dimensional codes such as bar codes, have information only in the horizontal direction, the two-dimensional codes are made to have information in the two-dimensional direction, that is, in the horizontal and vertical directions. Therefore, in addition to character strings of alphanumeric characters, Kana, Kanji, sentences, and the like can be encoded, and thus large-capacity data can be handled.

QR codes are codes that were developed in Japan and are the only codes that are recognized as an international standard in the AIM International (Automatic Identification Manufacturers International) among the two-dimensional codes. Later, these codes are also established as the Japanese Industrial Standard (JIS). The QR codes have merits such that large-capacity information can be represented in a small space. For example, in the case of information of only numerals, a maximum of 7089 characters can be encoded.

In this embodiment, QR codes are described as an example of two-dimensional codes. The present invention is not limited to this example, and, for example, DataMatrix (trademark), PDF 417 (trademark), cyber code (Cyber Code) (trademark), or the like may be used. Of course, the two-dimensional codes may be of a stack type or a matrix type.

The display control section 53 controls the display of the two-dimensional codes. For example, the display control section 53 displays, on the screen of a display section 24 (to be described later), the QR codes that are encoded from the SSID and the WEP key, which are "abcde123" and "xyz1359ab", respectively, which are supplied from the encoding section 52.

The input section 23 is formed of a switch or a dial, and supplies an operation signal responsive to the operation of a user to the control section 21. For example, the input section 23 is provided as a wireless LAN setting display button in the access point 11. When it is depressed by the user, the input section 23 supplies an operation signal responsive to the depression to the configuration information generation section 51.

The display section 24 is formed of, for example, an LCD (Liquid Crystal Display), an organic EL (Electroluminescent) display, and an LED (Light Emitting Diode) display, and displays two-dimensional codes under the control of the display control section 53. For example, under the control of the display control section 53, the display section 24 displays QR codes encoded from the SSID, which is "abcde123", and the WEP key, which is "xyz1359ab".

The communication section 25 is formed of an interface of a wired LAN such as the Ethernet, and connects with another apparatus via the network 14 and performs transmission and reception of data. For example, the communication section 25 connects with the personal computer 15 and performs transmission and reception of data via the network 14.

A configuration information storage section 26 is formed of, for example, a non-volatile memory such as an EEPROM (Electronically Erasable and Programmable Read Only Memory) or a flash memory, and stores various kinds of configuration information. That is, configuration information is set as a result of being stored in the configuration information storage section 26. The configuration information storage section 26 stores, for example, the SSID and the WEP key, which are set commonly in apparatuses such as the digital camera 12 and the personal computer 13 that are connected to the access point 11, which are supplied from the configuration information generation section 51.

The wireless communication section 28 wirelessly communicates with another apparatus, such as the digital camera 12 or the personal computer 13, demodulates the data by performing a predetermined process on the received modulation wave. For example, the wireless communication section 28 communicates with the digital camera 12 or the personal computer 13 by wireless in accordance with a communication method compliant with the standard of IEEE 802.11a, IEEE 802.11b, or IEEE 802.11g.

For example, when a signal is to be transmitted, the wireless communication section 28, under the control of the control section 21, receives a modulation wave transmitted from another device as a radio wave, and demodulates the data by performing a predetermined process on the received modulated wave. The wireless communication section 28, under the control of the control section 21, stores the demodulated data in the memory 22 via the bus 27. When a signal is to be transmitted, the wireless communication section 28, under the control of the control section 21, modulates the data by performing a predetermined process on the data stored in the memory 22, and transmits the modulated data to another apparatus.

When the wireless communication section 28 communicates with another apparatus by wireless, the control section 21 controls the communication of the wireless communication section 28 on the basis of the configuration information stored in the configuration information storage section 26. For example, the control section 21 compares the SSID transmitted from the other device with the SSID stored in the configuration information storage section 26, and controls the communication of the wireless communication section 28 so that, when the transmitted SSID matches the stored SSID, a wireless communication with the other apparatus is started. For example, the control section 21 encrypts data to be transmitted to the wireless communication section 28 by using the WEP key stored in the configuration information storage section 26 as an encryption key, or decodes the data received by the wireless communication section 28.

The wireless communication section 28 includes an antenna 61, a high-frequency processing section 62, a baseband processing section 63, and a MAC (Media Access Control) section 64.

When a signal is to be received, the antenna 61 receives a modulation wave transmitted from another device via a wireless communication as a radio wave. The antenna 61 supplies the signal of the received modulation wave to the high-frequency processing section 62. When a signal is to be transmitted, the antenna 61 radiates the modulated signal supplied from the high-frequency processing section 62 as a radio wave.

When a signal is to be received, the high-frequency processing section 62 demodulates the modulation wave supplied from the antenna 61 in accordance with a predetermined demodulation method. The high-frequency processing section 62 supplies the signal obtained by the demodulation to the baseband processing section 63. Furthermore, when a signal is to be transmitted, the high-frequency processing section 62 modulates the signal supplied from the baseband processing section 63 in accordance with a predetermined modulation method. The high-frequency processing section 62 supplies the modulated signal (modulation wave) to the antenna 61.

When a signal is to be received, the baseband processing section 63 converts a signal, which is an analog signal supplied from the high-frequency processing section 62, into data of a digital signal. The baseband processing section 63 supplies the data of the digital signal generated by the conversion to the MAC section 64. Furthermore, when a signal is to be transmitted, the baseband processing section 63 converts the data of the digital signal supplied from the MAC section 64 into a signal, which is an analog signal. The baseband processing section 63 supplies the signal generated by the conversion to the high-frequency processing section 62.

When a signal is to be received, the MAC section 64 converts the data supplied from the baseband processing section 63 into a predetermined format. For example, the MAC section 64 converts the data into data of a system in which a header and an error correction code are removed by extracting the header and the error correction code (error detection code) contained in the data supplied from the baseband processing section 63, by specifying the apparatus that transmitted the data on the basis of the header, and by correcting an error of the received data on the basis of the error correction code. The MAC section 64 stores the data that is converted into a predetermined format in the memory 22 or supplies the data to the control section 21 via the bus 27.

Furthermore, when a signal is to be received, the MAC section 64 converts data to be transmitted into a predetermined format. For example, the MAC section 64 converts the data into a predetermined format by reading data to be transmitted from the memory 22 and by attaching a header and an error correction code (error detection code) to the read data. The MAC section 64 supplies the data that is converted into a predetermined format to the baseband processing section 63.

A drive 29 is connected to the access point 11 as necessary. A magnetic disk 41 (for example, an HDD (Hard Disk)), an optical disc 42 (for example, a CD (Compact Disc) or a DVD (Digital Versatile Disc)), an optical magnetic disc 43 (for example, an MD (Mini-Disc) (trademark)), or a semiconductor memory 44 (for example, a memory card) is connected to the drive 29 as appropriate. The drive 29 reads a recorded program from the loaded magnetic disk 41, the optical disc 42, the optical magnetic disc 43, or the semiconductor memory 44, and supplies the read program to the control section 21.

As described above, the control section 21 can execute the program read from the magnetic disk 41, the optical disc 42, the optical magnetic disc 43, or the semiconductor memory 44, which is an example of a recording medium.

FIG. 3 is a block diagram showing the structure of the functions of the digital camera 12.

A camera section 101 is formed of, for example, an optical system such as an image-capturing element and a lens for forming an image on the image-capturing element, and a circuit for performing a predetermined signal process. The camera section 101, under the control of an image-capture control section 141, forms the image of a subject, photoelectrically converts the formed image, and generates image data corresponding to the image. The camera section 101, under the control of the image-capture control section 141, applies a predetermined signal process on the generated image data and supplies the image data on which the predetermined signal process is performed to the drive 109, thereby causing the image data to be recorded on the recording medium 110.

The camera section 101 includes an optical block 131, a CCD (Charge Coupled Device) 132, an A/D (Analog/Digital) conversion section 133, and a signal processing section 134.

The optical block 131 is formed of, for example, an optical lens, a focus mechanism, a shutter mechanism, and an aperture (iris) mechanism, and collects light reflected by the subject as an image, that is, forms an optical image of the subject on the photo-receiving section of the CCD 132.

The CCD 132 includes a CCD sensor, and photoelectrically converts the optical image formed by the optical block 131, thereby converting the optical image into an image signal, which is an analog electrical signal. The CCD 132 supplies the image signal, which is the analog electrical signal obtained as a result of the conversion, to the A/D conversion section 133.

The photoelectric conversion element in which the CCD 132 is used as an example is not limited to the CCD sensor, and may be any suitable an image-capturing element, such as a CMOS (Complementary Metal Oxide Semiconductor) sensor, which is capable of converting an optical image into an electrical signal.

The A/D conversion section 133 converts the image signal, which is an analog signal supplied from the CCD 132, into image data, which is a digital signal. The A/D conversion section 133 supplies the image data, which is the digital signal generated by the conversion, to the signal processing section 134.

The signal processing section 134 applies a predetermined signal process on the image data, which is a digital signal supplied from the A/D conversion section 133.

For example, the signal processing section 134 stores, in the memory 103, the image data supplied from the A/D conversion section 133 via a bus 102 and thus reads the image data stored in the memory 103 as appropriate. Then, the signal processing section 134 applies signal processes on the read image data, examples of such signal processes being an AGC (Automatic Gain Control) process for controlling the gain, an AWB (Auto White Balance) process for correcting the gradations of color of the image displayed by the whole image data on the basis of a predetermined reference color such as white by correcting the value (pixel value) of the image data, an AF (Auto Focus) process for focusing on a subject, and an AE (Auto Exposure) process for determining the exposure on the basis of the brightness of the subject.

Furthermore, on the basis of the image data supplied from the A/D conversion section 133, the signal processing section 134 performs an AF (Auto Focus) process for controlling the optical block 131 in order to focus on the subject.

Furthermore, the signal processing section 134 encodes image data on which a signal process is performed by, for example, a compression and encoding method for compressing and encoding predetermined still image (data), such as the JPEG (Joint Photographic Experts Group) system. The signal processing section 134 supplies, via the bus 102, the compressed image data to the drive 109 and records the image data on a recording medium 110 (for example, a semiconductor memory 124).

Furthermore, in response to an operation input from the user to an input section 105, such as a switch, a control key, or a touch panel provided on the screen of the display section 106, when image data desired by the user is read from the recording medium 110, the signal processing section 134 expands the image data by decoding the compressed and encoded image data supplied from the recording medium 110 via the bus 102 in accordance with the compression and encoding method, and supplies the expanded image data to the display section 106 via the bus 102, whereby the image is displayed.

The control section 104 is formed of a general-purpose CPU, MPU, or a dedicated processor, and controls each section of the digital camera 12. For example, the control section 104, which is a CPU, realizes various kinds of functions by executing a program stored in the memory 103, and controls each section of the digital camera 12.

Furthermore, the control section 104 supplies data to the memory 103 and obtains data that is temporarily stored by the memory 103 as necessary.

The control section 104 includes an image-capture control section 141, a decoding section 142, and a configuration information storage control section 143. For example, the control section 104, which is a CPU for executing a program, realizes the image-capture control section 141, the decoding section 142, and the configuration information storage control section 143.

The image-capture control section 141, the decoding section 142, and the configuration information storage control section 143 may be formed by hardware, and may also be realized by a computer for executing a program.

The image-capture control section 141 controls the camera section 101 so that the image such that the image of the subject is formed is photoelectrically converted to generate image data corresponding to the image. The image-capture control section 141 controls the camera section 101 so as to apply a predetermined signal process on the generated image data and so as to supply the image data on which the predetermined signal process is performed to the drive 109, whereby the image data is recorded on the recording medium 110.

The decoding section 142 decodes the image data of two-dimensional codes stored in the memory 103. For example, the decoding section 142 decodes the image data of QR codes 203 stored in the memory 103.

The configuration information storage control section 143 obtains (extracts) an SSID and a WEP key from the data obtained as a result of the decoding and supplies the obtained SSID and WEP key to the configuration information storage section 107. For example, the configuration information storage control section 143 obtains an SSID, which is "abcde123", and a WEP key, which is "xyz1359ab", from the data obtained as a result of the decoding, and supplies the obtained SSID and WEP key to the configuration information storage section 107.

The input section 105 is formed of, for example, a shutter release button used for the user to perform image capturing, a touch panel provided on the screen of the display section 109, or a control key (switch) (not shown), and supplies an operation signal corresponding to the operation (input) of the user to the control section 104.

The display section 106 is formed of, for example, an LCD, an organic EL display, an LED display, or the like, and displays various kinds of images and character strings. For example, the display section 106 displays an image to be displayed by decoded image data, which is supplied from the signal processing section 134. Furthermore, the display section 106 displays an image of a user interface of an application program started by the control section 104 in response to an operation of the user.

The configuration information storage section 107 is formed of, for example, a non-volatile memory such as an EEPROM or a flash memory, and stores various kinds of configuration information. That is, the configuration information is set as a result of being stored in the configuration information storage section 107.

For example, the configuration information storage section 107 stores the SSID, which is "abcde123", and the WEP key, which is "xyz1359ab", which are supplied from the configuration information storage control section 143, and thus sets them.

The wireless communication section 108 communicates with the access point 11 via a wireless connection. For example, the wireless communication section 108 communicates with another device in accordance with a communication method compliant with the standard of IEEE 802.11a, IEEE 802.11b, or IEEE 802.11g.

For example, when a signal is to be received, the wireless communication section 108, under the control of the control section 104, receives a modulation wave transmitted from the access point 11 as a radio wave, and demodulates the data by applying a predetermined process on the received modulation wave. The wireless communication section 108 stores the demodulated data in the memory 103 via the bus 102 under the control of the control section 104. Furthermore, when a signal is to be transmitted, under the control of the control section 104, the wireless communication section 108 modulates the data by performing a predetermined process on the data stored in the memory 103, and transmits the modulated data to the access point 11.

The wireless communication section 108 includes an antenna 151, a high-frequency processing section 152, a baseband processing section 153, and a MAC section 154.

When a signal is to be received, the antenna 151 receives, as a radio wave, a modulation wave transmitted from the access point 11 via a wireless communication. The antenna 151 supplies the signal of the received modulation wave to the high-frequency processing section 152. Furthermore, when a signal is to be transmitted, the antenna 151 transmits, as a radio wave, the modulated signal supplied from the high-frequency processing section 152.

When a signal is to be received, the high-frequency processing section 152 demodulates the modulation wave supplied from the antenna 151 in accordance with a predetermined demodulation method. The high-frequency processing section 152 supplies the signal obtained by the demodulation to the baseband processing section 153. Furthermore, when a signal is to be transmitted, the high-frequency processing section 152 modulates the signal supplied from the baseband processing section 153 in accordance with a predetermined modulation method. The high-frequency processing section 152 supplies the modulated signal (modulation wave) to the antenna 151.

When a signal is to be received, the baseband processing section 153 converts the signal, which is an analog signal supplied from the high-frequency processing section 152, into data of a digital signal. The baseband processing section 153 supplies the data of the digital signal generated by the conversion to the MAC section 154. Furthermore, when a signal is to be transmitted, the baseband processing section 153 converts the data of the digital signal supplied from the MAC section 154 into a signal, which is an analog signal. The baseband processing section 153 supplies the signal generated by the conversion to the high-frequency processing section 152.

When a signal is to be transmitted, the MAC section 154 converts the data supplied from the baseband processing section 153 into a predetermined format. For example, the MAC section 154 converts the data into data of a system in which a header, an error correction code, etc., are eliminated by extracting the header and the error correction code (error detection code), etc., contained in the data supplied from the baseband processing section 153, by specifying the access point 11 that transmitted the data on the basis of the header, and by correcting an error of the received data on the basis of the error correction code. The MAC section 154 stores the data that is converted into a predetermined format in the memory 103 or supplies the data to the control section 104.

Furthermore, when a signal is to be transmitted, the MAC section 154 converts the data to be transmitted into a predetermined format. For example, the MAC section 154 reads the data to be transmitted from the memory 103, and converts the data into a predetermined format by attaching a header and an error correction code (error detection code), etc., to the read data. The MAC section 154 supplies the data that is converted into a predetermined format to the baseband processing section 153.

The drive 109 writes data onto the loaded recording medium 110, or reads data or a program from the loaded recording medium 110. For example, when the recording medium 110 is a memory card, the drive 109 includes a predetermined interface in compliance with that memory card.

The recording medium 110 is formed of, for example, a magnetic disk 121 (for example, an HDD), an optical disc 122 (for example, a CD or a DVD), an optical magnetic disc 123 (for example, an MD (trademark)), or a semiconductor memory 124 (for example, a memory card). The recording medium 110 is removably loaded into the drive 109.

The drive 109 reads the recorded program from the loaded magnetic disk 121, optical disc 122, optical magnetic disc 123, or semiconductor memory 124, and supplies the read program to the control section 104.

As described above, the control section 104 can execute the program read from the recording medium 110, such as the magnetic disk 121, the optical disc 122, the optical magnetic disc 123, or the semiconductor memory 124.

Figure 4:
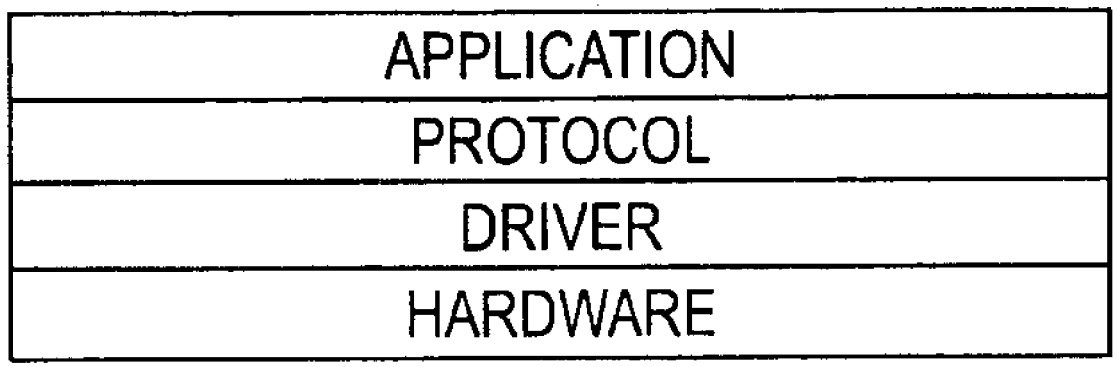
FIG. 4 illustrates an example of layer structure.

Next, a description will be given, with reference to FIG. 4, of an example of a layer structure in the access point 11 and the digital camera 12.

For example, the access point 11 and the digital camera 12 realize various kinds of processes in accordance with the layer structure formed of four layers of hardware, a driver, a protocol, and an application.

The hardware corresponds to, for example, a physical entity, such as an electronic circuit or a device, such as a wireless LAN card or a non-volatile memory.

The hardware corresponds to a physical layer of an OSI (Open Systems Interconnection) reference model. In the case of a wireless LAN, the hardware corresponds to one a direct sequence spread spectrum (DSSS) method for distributing a digital signal to a wide band by using a small electric power and for simultaneously transmitting the signal; a frequency hopping spectrum spread (FHSS) method for changing a frequency at which a signal is transmitted at intervals of a very short time and for transmitting the signal; and an infrared method.

The driver is, for example, software (program) for operating hardware such as peripheral devices. The driver, which is a program, is executed by the control section 21 or the control section 104, which is a computer.

For example, in the access point 11, the driver obtains a MAC address from the hardware and supplies the obtained MAC address to the application. Furthermore, the driver stores the SSID and the WEP key, which are generated by the application, in the hardware such as a non-volatile memory.

Furthermore, for example, in the digital camera 12, the driver allows the application to decode two-dimensional codes and store the SSID and the WEP key obtained as a result of the decoding in hardware, such as a non-volatile memory.

Furthermore, the driver corresponds to a data link layer of the OSI reference model. The data link layer is formed of an LLC (Logical Link Control) layer, which is a higher-order layer, and a MAC layer, which is a lower-order layer. In the case of a wireless LAN, in the lower-order MAC layer, a standard about a physical layer and a MAC layer in the wireless LAN is established. For example, the MAC layer is defined so as to be compliant with the IEEE 802.11 standard and the CSMA/CA (Carrier Sense Multiple Access with Collision Avoidance) method, which is a method of sending out data after confirming that another device has not transmitted a signal.

The protocol is a protocol when data communication is performed among apparatuses. For example, the access point 11 and the digital camera 12 mutually communicate with each other in accordance with a predetermined protocol, such as TCP/IP. For example, the protocol is realized by software (program), and the protocol, which is a program, is performed by the control section 21 or the control section 104, which is a computer.

Furthermore, the protocol corresponds to a network layer and a transport layer of the OSI reference model. The protocol defines a method for making a routing for transmitting data in the network layer, defines a method of converting an IP (Internet Protocol) address and a packet size, and defines reliability of data transfer, such as a TCP (Transmission Control Protocol), a UDP (User Datagram Protocol), and error correction data transfer in the transport layer.

The application corresponds to software (application program) designed for a specific object, such as a process related to the setting of a wireless LAN.

For example, in the access point 11, the application program generates an SSID and a WEP key. Furthermore, the application program generates two-dimensional codes (encodes the SSID, the WEP key, and the MAC address into two-dimensional codes) on the basis of the generated SSID and WEP key, and the MAC address that is obtained by the driver from the hardware, and displays the generated two-dimensional codes on hardware, which is the display section 24 formed of, for example, an LCD.

Furthermore, for example, in the digital camera 12, the application decodes the two-dimensional codes and supplies the SSID and the WEP key obtained as a result of the decoding to the driver.

Furthermore, the application corresponds to the session layer, the presentation layer, and the application layer of the OSI reference model. The application defines connection and disconnection among apparatuses in the session layer, defines data representation, such as a compression format and character codes, in the presentation layer, and defines a process that is directly related to, for example, an operation of the user in the application layer.

Next, a description will be given, with reference to the flowchart in FIG. 5, of a configuration information display process by the access point 11.

In step S11, the control section 21 performs an initialization process. For example, in step S11, when an initialization switch (not shown) provided in the access point 11 is depressed by the user, the control section 21 initializes (clears) the set configuration information (the SSID, the WEP key, etc.) and also initializes (clears) the configuration information (the SSID, the WEP key, etc.) stored in the configuration information storage section 26.

When the initialization process is performed, the configuration information is initialized (for example, returns to the setting before the shipment from the factory). Therefore, it is necessary to again set the configuration information in an apparatus connected to the access point 11 and a wireless LAN segment in which the access point 11 is a relay station. In this case, for example, it is necessary to again set configuration information in the access point 11, the digital camera 12, and the personal computer 13.

Figure 5:
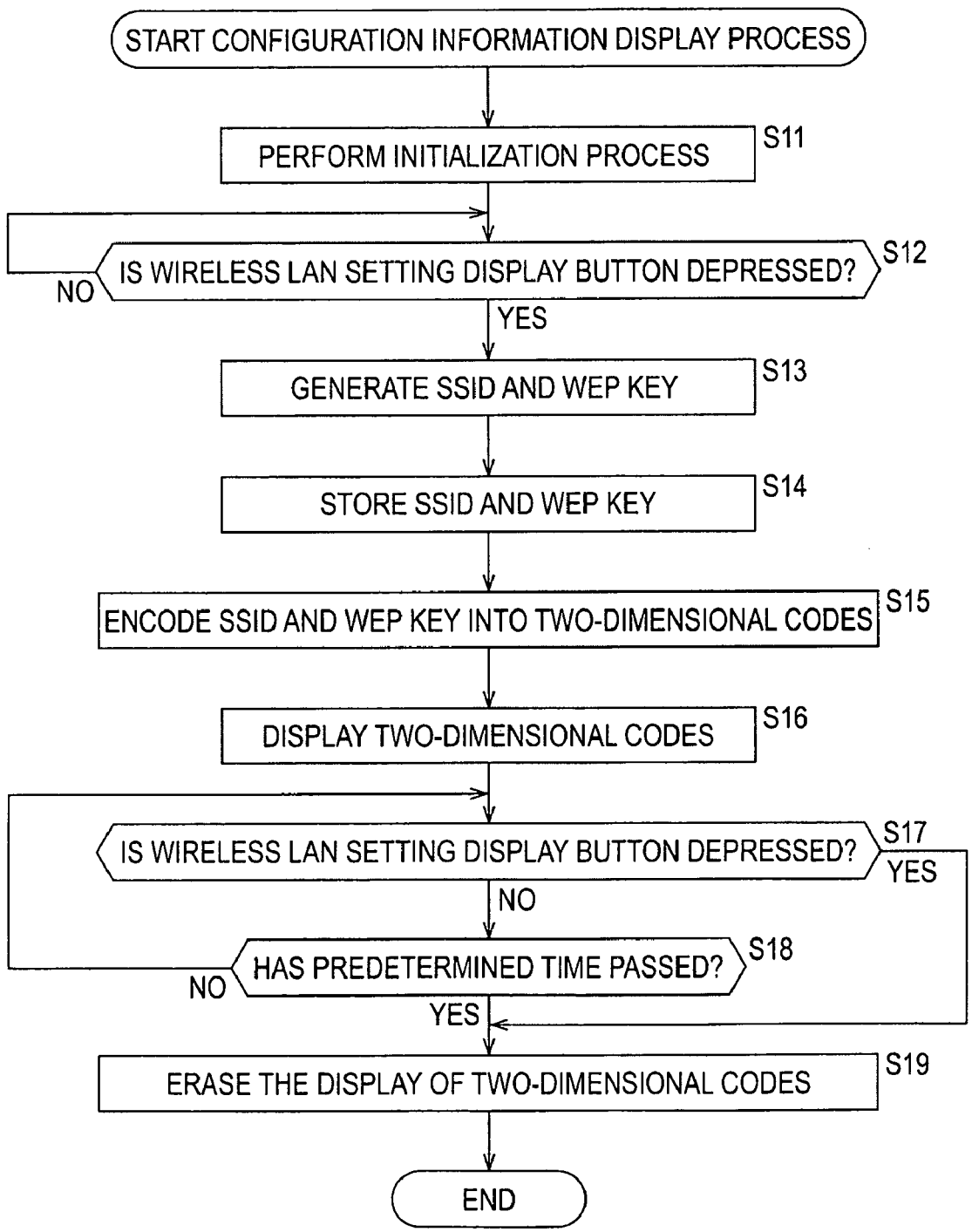
FIG. 5 is a flowchart illustrating a configuration information display process by an access point.

That is, the configuration information display process described with reference to FIG. 5 is a process when configuration information is newly set (during a purchase or the like), or a process when the configuration information that is already set is initialized and the configuration information is set again.

In step S12, on the basis of an operation signal supplied from the input section 23, the control section 21 determines whether or not a wireless LAN setting display button (for example, a wireless LAN setting display button 201 of FIG. 7 (to be described later)), which is the input section 23 provided in the access point 11, has been depressed.

When it is determined in step S12 that the wireless LAN setting display button has not been depressed, the display of the configuration information from the user has not been instructed. Therefore, the process returns to step S12, and the above-described processing is repeated. That is, the process of step S12 is repeated until the wireless LAN setting display button is depressed by the user.

On the other hand, when it is determined in step S12 that the wireless LAN setting display button has been depressed, the display of the configuration information has been instructed from the user. Therefore, the process proceeds to step S13, where the configuration information generation section 51 generates random numbers, such as a binomial random number, a Poisson random number, or a normal random number, generates an SSID and a WEP key by setting the generated random numbers as the SSID and the WEP key, and supplies the generated SSID and WEP key to the configuration information storage section 26 and the encoding section 52.

Here, as described above, the SSID and the WEP key are initialized (process of step S11). Therefore, when communication is performed via a wireless LAN of an infrastructure method, it is necessary to set an SSID, which is an identifier output for specifying a specific network in a common wireless LAN, and a WEP key, which is an encryption key for encrypting data, in the access point 11 and each device connected to a wireless LAN segment in which the access point 11 is a relay station.

More specifically, the SSID is any character string in which alphanumeric characters of 32 bytes or less are combined. In general, when a plurality of LAN segments are constructed using the same frequency band, there is a possibility that an interference occurs. Therefore, as a result of causing the wireless LAN segment to be joined to be recognized according to the value of the SSID, it becomes not possible for apparatuses having a different SSID to communicate with one another.

The WEP key is formed of a character string of 8 bytes (64 bits) or 16 bytes (128 bits), and has a value for generating a key that is set as desired. More accurately, in the encryption by the WEP, a key that is actually used to encrypt or decrypt data is generated on the basis of the WEP key, and the generated key is set as a common key on the transmission side and on the receiving side. As a consequence, the data to be transmitted is encrypted, and the received data is decrypted.

That is, in order to use a wireless LAN of the same segment, it is necessary to set the same SSID and the same WEP key. Even when the WEP key is not specified, communication can be performed. However, by specifying the WEP key, data can be encrypted, and therefore, secrecy can be improved.

For example, in step S13, the configuration information generation section 51 generates an SSID, which is "abcde123", and a WEP key, which is "xyz1359ab", by using a random number, such as a binomial random number, a Poisson random number, or a normal random number, and supplies the generated SSID and the generated WEP key to the configuration information storage section 26 or supplies them to the configuration information storage section 26 and the encoding section 52.

In step S14, the configuration information storage section 26 stores the SSID and the WEP key, which are supplied from the configuration information generation section 51. For example, in step S14, the configuration information storage section 26 stores the SSID, which is "abcde123", and the WEP key, which is "xyz1359ab", which are supplied from the configuration information generation section 51.

That is, as a result of the configuration information storage section 26 storing configuration information, such as an SSID and a WEP key, the configuration information is set in the access point 11. For example, as a result of the configuration information storage section 26 storing an SSID, which is "abcde123", and a WEP key, which is "xyz1359ab", it is necessary to set "abcde123" as the SSID and to set "xyz1359ab" as the WEP key in each of the apparatuses that are connected to the wireless LAN via the access point 11.

Although details will be described later, as a result of the configuration information storage section 26 storing the SSID and the WEP key, when an SSID and a WEP key are set, it becomes possible to allow another device to read the SSID and the WEP key stored in the configuration information storage section 26 and to set the same SSID and WEP key in the other device. Therefore, this makes it possible for the other device to be connected to the wireless LAN segment by the access point 11.

In step S15, the encoding section 52 reads the stored SSID and WEP key from the configuration information storage section 26, encodes the read SSID and WEP key into two-dimensional codes, and supplies the encoded two-dimensional codes to the display control section 53. That is, in step S15, the encoding section 52 encodes the SSID and the WEP key, which are set configuration information for rejecting unauthorized connection and for connecting only an authorized party, are encoded into two-dimensional codes. For example, in step S15, the encoding section 52 encodes the SSID, which is "abcde123", and the WEP key, which is "xyz1359ab", which are stored in the configuration information storage section 26, into QR codes, and supplies the encoded QR codes to the display control section 53.

In step S15, the encoding section 52 may encode the SSID and the WEP key supplied from the configuration information generation section 51 into two-dimensional codes and may supply the encoded two-dimensional codes to the display control section 53.

Figures 6, 7:
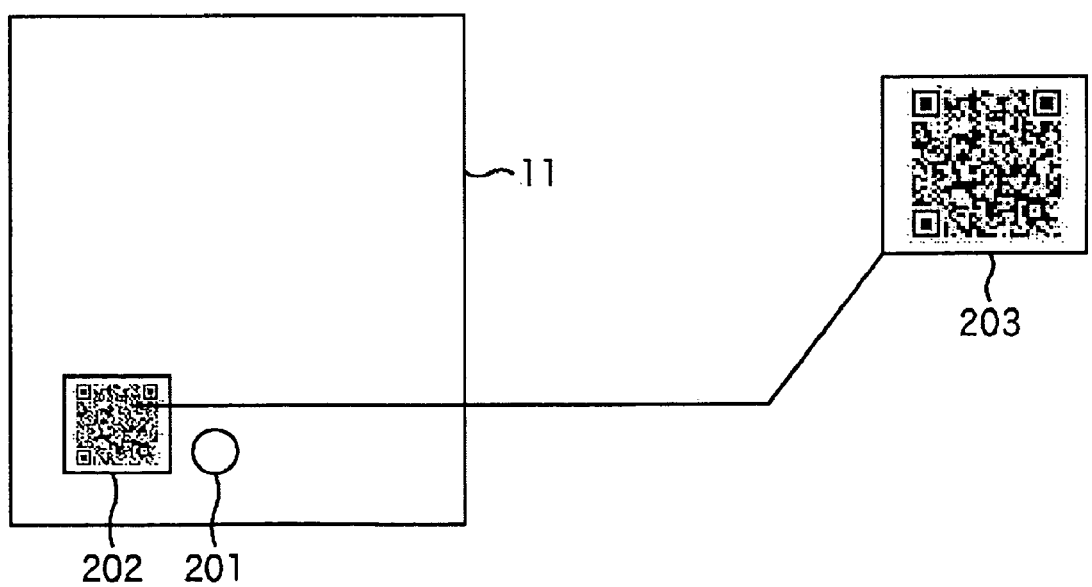
FIG. 6 illustrates a specific example of set-information that is encoded into two-dimensional codes.
FIG. 7 shows the exterior of an access point, in which two-dimensional codes are displayed.

FIG. 6 illustrates a specific example of configuration information that is encoded into two-dimensional codes.

A header is arranged at the beginning of the configuration information. In the header, for example, information, such as identification information formed of a specific array indicating being configuration information, version information indicating the version of two-dimensional codes method indicating configuration information, and a header length indicating the amount of data (number of bytes) of the header itself, is stored.

A 4-byte identification code is arranged next to the header, and following the identification code, a 6-byte MAC address is arranged. The identification code is a code for identifying the MAC address and is formed of a data array specific to the identification code for identifying the MAC address. Furthermore, the MAC address is formed of a 3-byte maker code and a 3-byte manufacture number. By combining the maker code of each maker and the manufacture number, which is a unique ID (Identity) in that maker, the MAC address becomes a unique value with respect to the apparatus.

A 4-byte identification code is arranged next to the MAC address, and following the identification code, a 32-byte SSID is arranged. The identification code is a code for identifying the SSID and is formed of a data array specific to the identification code for identifying the SSID. As the SSID, for example, data of 32 bytes or less like "abcde123" is stored.

A 4-byte identification code is arranged next to the SSID, and following the identification code, an 8-byte or 16-byte WEP key is arranged. The identification code is a code for identifying the WEP key and is formed of a data array specific to the identification code for identifying the WEP key. As the WEP key, for example, data of 16 bytes or less like "xyz1359ab" is stored.

Since the access point 11 encodes configuration information in such a format into two-dimensional codes, it is possible for an apparatus on the side where two-dimensional codes are read (for example, the digital camera 12) to reliably obtain the value of the MAC address, the SSID, or the WEP key from the two-dimensional codes on the basis of the identification code. As a result of the above, it is possible for the apparatus on the side where two-dimensional codes are read (for example, the digital camera 12) to prevent the data contained in the two-dimensional codes as the MAC address, the SSID, or the WEP key from being obtained from the two-dimensional codes in which identification code is not stored.

The above-described amount of data of each piece of the configuration information is only an example, and the amount of data of the identification code can also be 2 bytes rather than 4 bytes. Furthermore, the amounts of these pieces of the data can also be of a variable length rather than being a fixed length.

Referring back to the flowchart in FIG. 5, in step S16, the display control section 53 displays the two-dimensional codes supplied from the encoding section 52 on the screen of the display section 24. For example, in step S16, the display control section 53 displays, on the screen of the display section 24, QR codes in which the SSID, which is "abcde123", and the WEP key, which is "xyz1359ab", which are supplied from the encoding section 52, are encoded.

FIG. 7 shows the exterior of the access point 11, in which two-dimensional codes are displayed.

The access point 11 is provided with the wireless LAN setting display button 201 as the input section 23 and a screen 202 of the display section 24. For example, the screen 202 of the display section 24 is provided in the vicinity of the wireless LAN setting display button 201.

When the user depresses the wireless LAN setting display button 201, QR codes (two-dimensional codes) 203 are displayed on the screen 202 of the display section 24. For example, on the screen 202 of the display section 24, as a result of the user depressing the wireless LAN setting display button 201 (process of step S12), QR codes 203 in which the SSID, which is "abcde123", and the WEP key, which is "xyz1359ab", are encoded, are displayed (process of step S16).

Referring back to the flowchart in FIG. 5, in step S17, on the basis of the operation signal supplied from the input section 23, the control section 21 determines whether or not the wireless LAN setting display button 201 provided in the access point 11 has been depressed by the user.

When it is determined in step S17 that the wireless LAN setting display button 201 has been depressed, the completion of the display of the two-dimensional codes has been instructed from the user. Therefore, the process proceeds to step S19, where the display control section 53 causes the display section 24 to erase the display of the two-dimensional codes. For example, in step S19, the display control section 53 causes the display section 24 to erase the display of the QR codes 203 in which the SSID, which is "abcde123", and the WEP key, which is "xyz1359ab", are encoded, which was displayed on the screen 202 of the display section 24.

On the other hand, when it is determined in step S17 that the wireless LAN setting display button 201 has not been depressed, the process proceeds to step S18, where the control section 21 displays the two-dimensional codes on the display section 24 and thereafter determines whether or not a predetermined time (for example, 30 seconds) has passed.

When it is determined in step S18 that the predetermined time has not passed, the process returns to step S17, and the above-described processing is repeated. That is, as a result of the processes of step S17 and step S18 being repeated, when the wireless LAN setting display button 201 is depressed by the user or when the predetermined time has passed, the display of the two-dimensional codes (QR codes 203) displayed on the screen 202 of the display section 24 is erased.

On the other hand, when it is determined in step S18 that the predetermined time has passed, the process proceeds to step S19, where the display control section 53 erases the display of the two-dimensional codes from the display section 24, and the processing is then completed.

As described above, according to the embodiment of the present invention, by encoding configuration information, such as an SSID and a WEP key, into two-dimensional codes and by causing an apparatus connected to a wireless LAN to read the two-dimensional codes, the setting of the wireless LAN can easily be performed. Therefore, it is possible for even a user not having expertise knowledge about networks to perform the setting of the wireless LAN.

Next, a description will be given, with reference to the flowchart in FIG. 8, of a set-information setting process by the digital camera 12.

In step S31, on the basis of an operation signal supplied from the input section 105, the control section 104 determines whether or not a wireless LAN setting command of a menu screen displayed on the screen of the display section 106 has been selected by the user.

Here, the wireless LAN setting command of the menu screen refers to a command for performing the setting of the wireless LAN among the commands arranged on the menu screen for performing various kinds of setting. When the wireless LAN setting command is selected, the digital camera 12 changes the mode from the "image-capturing mode" for image-capturing a subject to a "setting mode" for performing the setting of various kinds of apparatuses.

When it is determined in step S31 that the wireless LAN setting command of the menu screen has not been selected, the process returns to step S31, and the above-described processing is repeated. That is, while the process of step S31 is repeated until the wireless LAN setting command of the menu screen is selected by the user, the digital camera 12 operates in the "image-capturing mode".

On the other hand, when it is determined in step S31 that the wireless LAN setting command of the menu screen has been selected, the process proceeds to step S32, where the control section 104 starts up the application program for the wireless LAN setting, which is stored in the memory 103.

Here, the application program of the wireless LAN setting refers to a program for performing the setting related to the wireless LAN in the digital camera 12. Furthermore, the application program of the wireless LAN setting is a program corresponding to the application among specific examples of the layer structure formed of four hierarchies of FIG. 4.

In step S33, the image-capture control section 141 causes the CCD 132 to image capture two-dimensional codes displayed on the display section 24 of the access point 11 in response to an operation of the user. For example, in step S33, on the basis of the operation of the user, the image-capture control section 141 causes the CCD 132 to image capture the QR codes 203 in which the SSID, which is "abcde123", and the WEP key, which is "xyz1359ab", which are displayed on the screen 202 of the display section 24 of the access point 11, are encoded.

A description is given in detail below. The CCD 132 supplies the image data of the image-captured QR codes 203 to the A/D conversion section 133. The A/D conversion section 133 converts the image data of the two-dimensional codes, which is analog data, supplied from the CCD 132, into digital data, and supplies the image data of the two-dimensional codes, which is digital data obtained by the conversion, to the signal processing section 134.

The signal processing section 134 performs a predetermined process on the image data of the two-dimensional codes supplied from the A/D conversion section 133 and stores the data on which the predetermined process has been performed in the memory 103. For example, the signal processing section 134 performs a predetermined process, such as an AGC process, an AWB process, an AF process, and an AE process, on the image data of the QR codes 203 supplied from the A/D conversion section 133, and stores the data on which the predetermined process has been performed in the memory 103.

Figure 9:
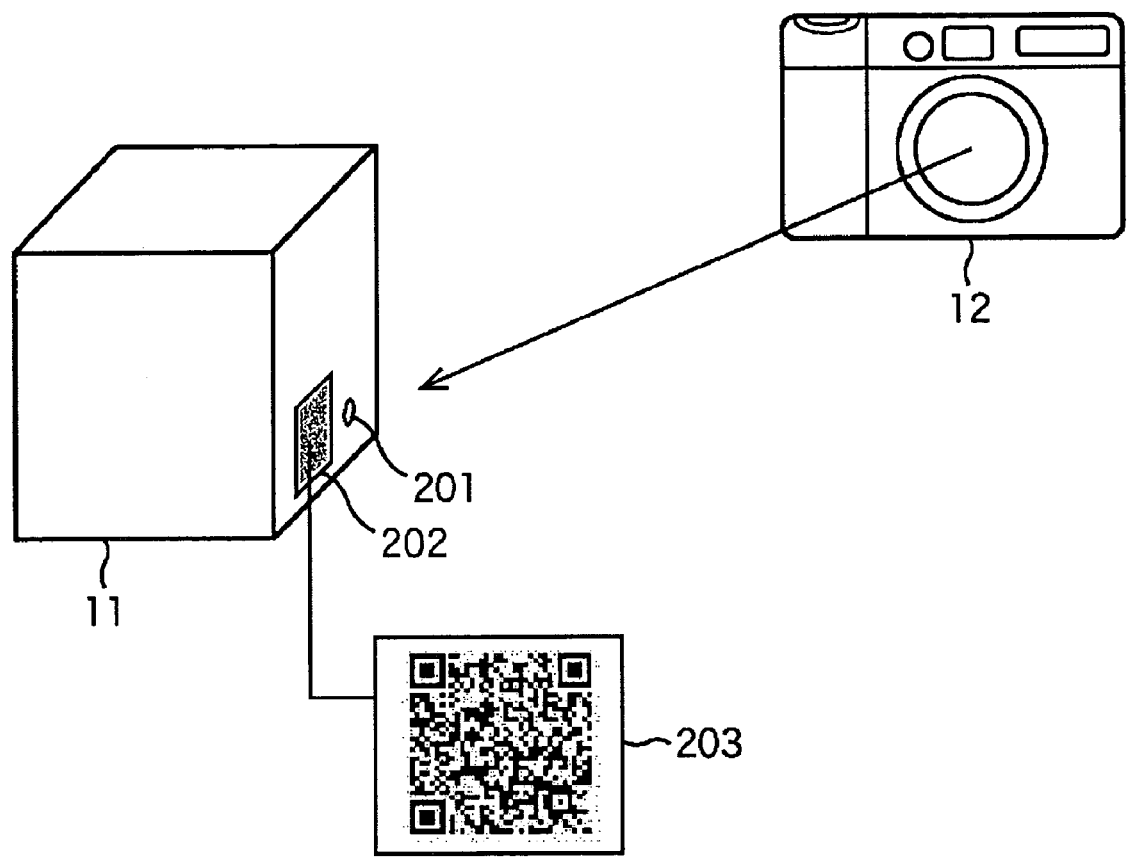
FIG. 9 illustrates a digital camera for image-capturing QR codes displayed on the screen of a display section of an access point.

FIG. 9 illustrates the digital camera 12 for image capturing the QR codes 203 displayed on the screen 202 of the display section 24 of the access point 11.

components in FIG. 9, which are identical to those in FIG. 7, are designated with the same reference numerals, and accordingly descriptions thereof are omitted.

On the screen 202 of the display section 24 of the access point 11, as a result of the user depressing the wireless LAN setting display button 201, the QR codes 203 in which the SSID, which is "abcde123", and the WEP key, which is "xyz1359ab", are encoded, is displayed. In response, the user depresses a shutter release button of the input section 105 of the digital camera 12, thereby causing the digital camera 12 to image capture the QR codes 203 displayed on the screen 202.

Figure 8:
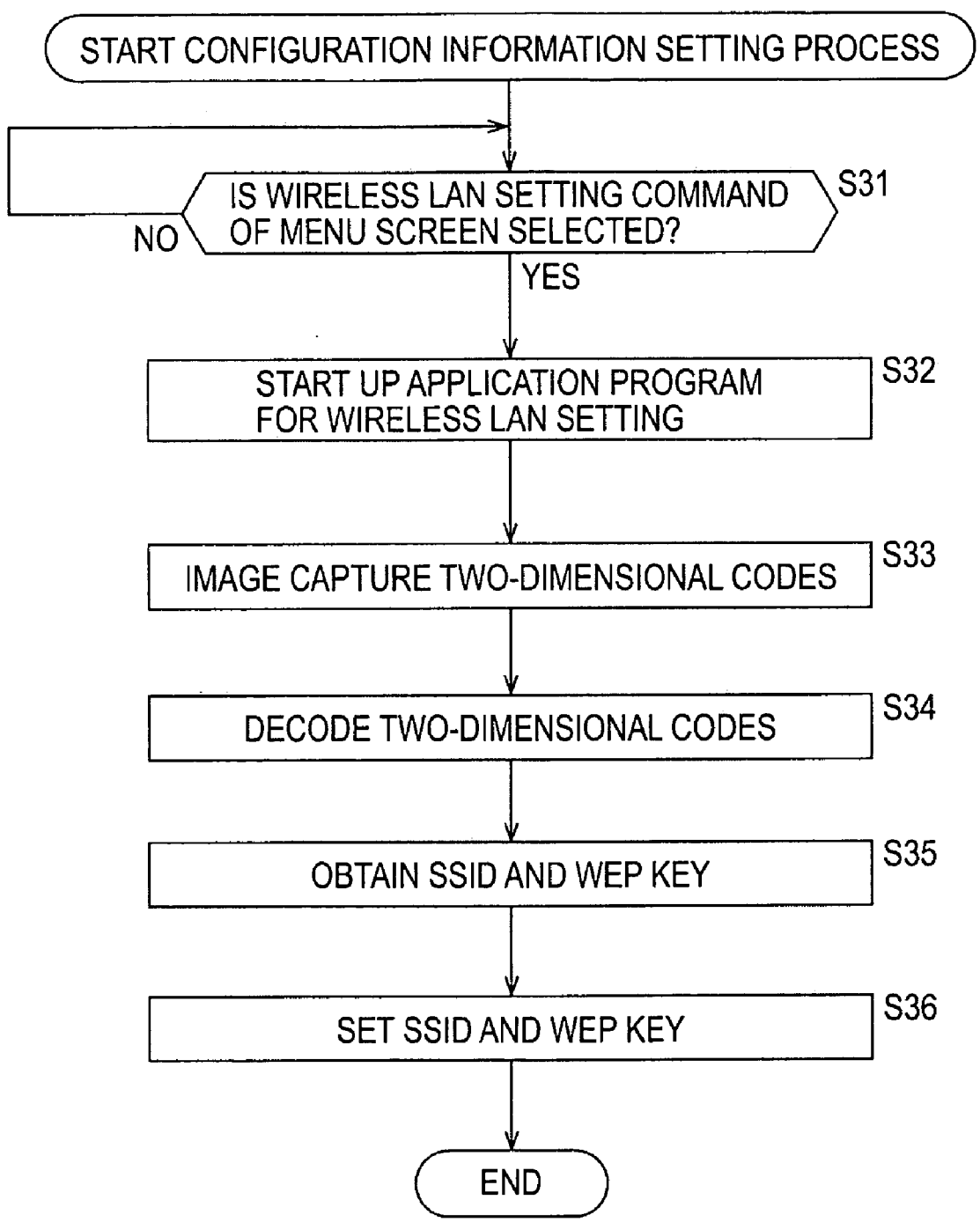
FIG. 8 is a flowchart illustrating a configuration information setting process by a digital camera.

Referring back to the flowchart in FIG. 8, in step S34, the decoding section 142 decodes (decrypts) the image data of the two-dimensional codes stored in the memory 103. For example, in step S34, the decoding section 142 decodes the image data of the QR codes 203 stored in the memory 103.

In step S35, the configuration information storage control section 143 obtains (extracts) the SSID and the WEP key from the data obtained as a result of the decoding, and supplies the obtained SSID and WEP key to the configuration information storage section 107. For example, in step S35, the configuration information storage control section 143 obtains the SSID, which is "abcde123", and the WEP key, which is "xyz1359ab", and supplies the obtained SSID and WEP key to the configuration information storage section 107.

In step S36, the configuration information storage section 107 sets the SSID and the WEP key by storing the SSID and the WEP key supplied from the configuration information storage control section 143, and the processing is then completed. For example, in step S36, the configuration information storage section 107 stores the SSID, which is "abcde123", and the WEP key, which is "xyz1359ab", which are supplied from the configuration information storage control section 143.

That is, since the SSID, which is "abcde123", and the WEP key, which is "xyz1359ab", which are the same as those of the access point 11 are set in the digital camera 12, it is possible to connect the digital camera 12 to the wireless LAN in which the access point 11 is a relay station.

At this time, by changing the mode from the "setting mode" to the "image-capturing mode", the digital camera 12 returns to the state in which a subject can be image captured.

As described above, according to the embodiment of the present invention, two-dimensional codes displayed in the access point 11 are image-captured, and the SSID and the WEP key are obtained from the image-captured two-dimensional codes. Therefore, since the setting of the wireless LAN can easily be performed, it is possible for even a user not having expertise knowledge about networks to set the wireless LAN.

According to the embodiment of the present invention, since two-dimensional codes displayed in the access point 11 are image-captured, various kinds of configuration information are not transmitted by a radio wave. As a consequence, it is difficult to externally intercept configuration information (an SSID, an WEP key, etc.), and thus secrecy can be improved.

If the displayed two-dimensional codes cannot be viewed, it is not possible to know the configuration information of the wireless LAN. For example, when a wireless LAN is to be constructed within a household, as a result of setting the wireless LAN within the household, it is not possible to know the configuration information of the wireless LAN from outside the household. For example, it is difficult to image capture two-dimensional codes from a distant place by using a telescope to such a degree that they can be decoded. Therefore, it is possible for the user to prevent configuration information from being illegally known by only paying attention to the vicinity of the access point 11.

As described above, in the process of step S11 (FIG. 5), an initialization process is performed. As a result of performing initialization, the set SSID and WEP key are initialized (cleared), the configuration information to be set in the access point 11 is changed, and also, the configuration information that is already set in the apparatus connected to the wireless LAN segment in which the access point 11 is a relay station becomes invalid because it becomes a value differing from that of the access point 11. That is, as a result of performing an initialization process, the configuration information set in each of the apparatuses becomes invalid, and therefore, the configuration information needs to be set again.

For example, when an apparatus to be connected to the wireless LAN segment in which the access point 11 is a relay station is to be newly added, if an initialization process is performed, it is necessary to again set the configuration information with respect to the access point 11 and the apparatus connected to the wireless LAN segment.

Since the configuration information is stored in the configuration information storage section 26 (process of step S14) (FIG. 5)), in such a case, the initialization process (process of step S11 (FIG. 5)) is not performed, and the configuration information stored in the configuration information storage section 26 is read. As a result, it becomes possible to set the same configuration information as that of the access point 11 with respect to an apparatus to be newly added without changing the configuration information set in the access point 11 and the apparatus connected to the wireless LAN segment in which the access point 11 is a relay station. As a result, the apparatus to be newly added can further be connected to the wireless LAN segment in which the access point 11 is a relay station.

Figure 10:
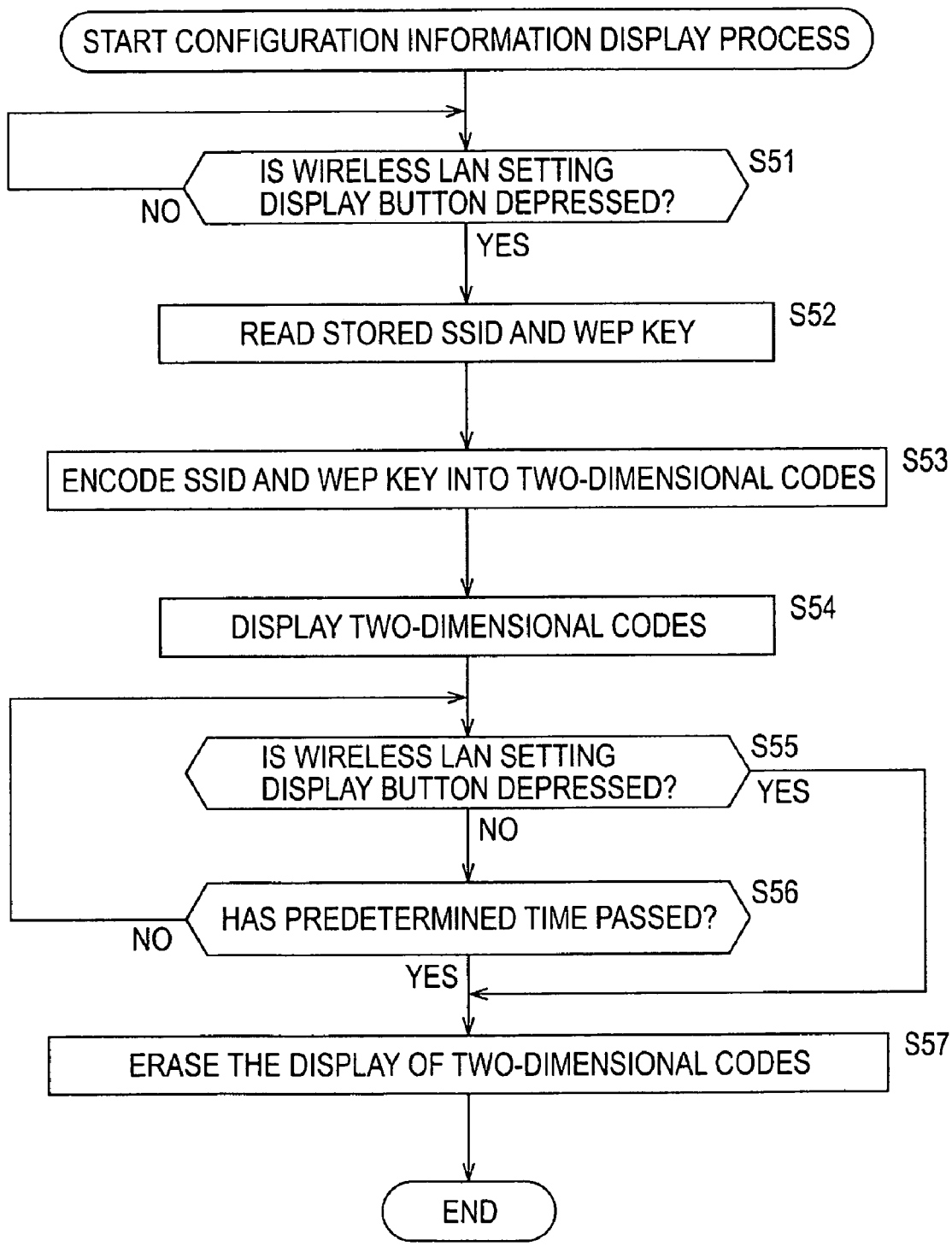
FIG. 10 is a flowchart illustrating a configuration information display process by an access point.

Next, a description will be given, with reference to the flowchart in FIG. 10, of processing when configuration information that is already set is not initialized and configuration information is set in the apparatus to be connected to the wireless LAN segment in which the access point 11 is a relay station.

The process of step S51 is identical to the process of step S12 of FIG. 5, and descriptions thereof are omitted.

In step S52, the encoding section 52 reads the SSID and the WEP key stored in the configuration information storage section 26. For example, in step S52, the encoding section 52 reads an SSID, which is "abcde123", and a WEP key, which is "xyz1359ab", which are stored in the configuration information storage section 26.

Each process of step S53 to step S57 is identical to each process of step S15 to step S19 of FIG. 5, and descriptions thereof are omitted.

As described above, according to the embodiment of the present invention, configuration information, such as an SSID and a WEP key, is encoded into two-dimensional codes, and the encoded two-dimensional codes are read by an apparatus connected to the wireless LAN. As a consequence, since the setting of the wireless LAN can easily be performed, it is possible for even a user not having expertise knowledge about networks to perform the setting of the wireless LAN.

Furthermore, an apparatus to be connected to the wireless LAN can easily be connected to a desired wireless LAN segment.

Furthermore, since the configuration information is not transmitted by a radio wave, it is not possible to externally intercept the configuration information, and secrecy can be improved. Therefore, it is possible for the user to use the wireless LAN with a sense of security.

In the above-described examples, the image to be displayed on the screen of the display section 24 of the access point 11 has been described as being two-dimensional codes, but the present invention is not limited to such an example. For example, the image needs only be an image in which an SSID and a WEP key, such as bar codes, can be embedded.

The image to be displayed on the screen of the display section 24 of the access point 11 is not limited to codes, such as two-dimensional codes and bar codes, and a character string such as text may be displayed in a state in which it is not encoded into two-dimensional codes. In this case, for example, the display control section 53 displays, on the screen of the display section 24, the SSID, which is "abcde123", and the WEP key, which is "xyz1359ab", as the configuration information generated by the configuration information generation section 51.

As a result of the above, for example, even an apparatus not in compliance with QR codes can be connected to the wireless LAN via the access point 11 by the user by referring to a character string (for example, an SSID, which is "abcde123", and a WEP key, which is "xyz1359ab"), such as text to be displayed on the screen of the display section 24 of the access point 11 and by inputting and setting the character string in that device through the operation of the user.

Furthermore, on the screen of the display section 24 of the access point 11, configuration information, such as the SSID and the WEP key that are set in the wireless LAN by the access point 11 at that time (stored in the configuration information storage section 26) can be displayed.

In the above-described examples, the configuration information has been described as being an SSID, which is an identifier for specifying a specific network in the wireless LAN, and a WEP key, which is an encryption key for encrypting data to be communicated. The present invention is not limited to such configuration information, and the configuration information may be information (data) necessary to set the wireless LAN, such as information about security of the wireless LAN.

Although the series of the above-described processes can be performed by hardware, it can also be performed by software. When the series of processes is to be performed by software, a program forming the software is installed from a recording medium into a computer incorporated into dedicated hardware or is installed into, for example, a general-purpose personal computer capable of executing various functions by installing various programs.

The recording medium, as shown in FIG. 2, is formed of a packaged medium composed of the magnetic disk 41 (including a flexible disk), the optical disc 42 (including a CD-ROM (Compact Disc-Read Only Memory)), the magneto-optical disc 43 (including an MD (trademark)), or the semiconductor memory 44, in which a program is recorded, the recording medium being distributed to provide the program to the user separately from a computer. In addition, the recording medium is formed of a ROM (not shown) in which a program is recorded, which is provided to the user by being incorporated in advance into the computer.

The recording medium, as shown in FIG. 3, is formed of a packaged medium composed of the magnetic disk 121 (including a flexible disk), the optical disc 122 (including a CD-ROM (Compact Disc-Read Only Memory)), the magneto-optical disc 123 (including an MD (trademark)), or the semiconductor memory 124, in which a program is recorded, the recording medium being distributed to provide the program to the user separately from a computer. In addition, the recording medium is formed of a ROM (not shown) in which a program is recorded, which is provided to the user by being incorporated in advance into the computer.

The program for performing the above-described series of processes may be installed into a computer via a wired or wireless communication medium, such as a local area network, the Internet, digital satellite broadcasting, via an interface such as a router and a modem, as necessary.

In this specification, the steps for writing a program stored on a recording medium include not only processes which are carried out chronologically in the written order, but also processes which are executed concurrently or individually although these steps are not necessarily processed chronologically.

In this specification, the system represents the overall apparatus formed of a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
   a first communication apparatus; and
   a second communication apparatus,
   wherein the first communication apparatus and the second communication apparatus communicate with each other by wireless,
   wherein the first communication apparatus includes
      first storage means for storing configuration information for rejecting unauthorized connection and for connecting only an authorized party,
      encoding means for encoding the stored configuration information into two-dimensional codes, and
      display control means for controlling display of the two-dimensional codes, and wherein the second communication apparatus includes
image-capture control means for controlling image capture of the displayed two-dimensional codes,
decoding means for decoding the image-captured two-dimensional codes into the configuration information, and
second storage means for storing the decoded configuration information.

2. A communication apparatus for performing a wireless communication, comprising:
storage means for storing configuration information for rejecting unauthorized connection and for connecting only an authorized party, the configuration information including a service set ID (SSID), which is an identifier for specifying a specific network in the wireless communication, and a wired equivalent privacy (WEP) key, which is an encryption key for encrypting data;
encoding means for encoding the stored configuration information into two-dimensional codes; and
display control means for controlling display of the two-dimensional codes.

3. The communication apparatus according to claim 2, further comprising:
generation means for generating the configuration information.

4. The communication apparatus according to claim 2, wherein the encoding means encodes the stored configuration information into quick response (QR) codes.

5. The communication apparatus according to claim 2, wherein the configuration information is selected as desired and becomes a common value on the transmission side and on the reception side.

6. A communication method for use with a communication apparatus for performing a wireless communication, the communication method comprising:
controlling the storage of configuration information for rejecting unauthorized connection and for connecting only an authorized party, the configuration information including a service set ID (SSID), which is an identifier for specifying a specific network in the wireless communication, and a wired equivalent privacy (WEP) key, which is an encryption key for encrypting data;
encoding the stored configuration information into two-dimensional codes;
controlling display of the two-dimensional codes.

7. A recording medium having recorded thereon a computer-readable program for performing a wireless communication process, the computer-readable program comprising:
controlling the storage of configuration information for rejecting unauthorized connection and for connecting only an authorized party, the configuration information including a service set ID (SSID), which is an identifier for specifying a specific network in the wireless communication, and a wired equivalent privacy (WEP) key, which is an encryption key for encrypting data;
encoding the stored configuration information into two-dimensional codes; and
controlling display of the two-dimensional codes.

8. A communication apparatus for performing a wireless communication, comprising:
image-capture control means for controlling image capture of two-dimensional codes in which configuration information for rejecting displayed unauthorized connection and for connecting only an authorized party is encoded, the configuration information including a service set ID (SSID), which is an identifier for specifying a specific network in the wireless communication, and a wired equivalent privacy (WEP) key, which is an encryption key for encrypting data;
decoding means for decoding the image-captured two-dimensional codes into the configuration information; and
storage means for storing the decoded configuration information.

9. The communication apparatus according to claim 8, wherein the decoding means decodes image-captured quick response (QR) codes into the configuration information.

10. A communication method for use with a communication apparatus for performing a wireless communication, the communication method comprising:
controlling image capture of two-dimensional codes in which configuration information for rejecting displayed unauthorized connection and for connecting only an authorized party is encoded, the configuration information including a service set ID (SSID), which is an identifier for specifying a specific network in the wireless communication, and a wired equivalent privacy (WEP) key, which is an encryption key for encrypting data;
decoding the image-captured two-dimensional codes into the configuration information; and
controlling the storage of the decoded configuration information.

11. A recording medium having recorded thereon a computer-readable program for performing a wireless communication process, the computer-readable program comprising:
controlling image capture of two-dimensional codes in which configuration information for rejecting displayed unauthorized connection and for connecting only an authorized party is encoded, the configuration information including a service set ID (SSID), which is an identifier for specifying a specific network in the wireless communication, and a wired equivalent privacy (WEP) key, which is an encryption key for encrypting data;
decoding the image-captured two-dimensional codes into the configuration information; and
controlling the storage of the decoded configuration information.

12. A communication apparatus for performing a wireless communication, comprising:
a storage section configured to store configuration information for rejecting unauthorized connection and for connecting only an authorized party, the configuration information including a service set ID (SSID), which is an identifier for specifying a specific network in the wireless communication, and a wired equivalent privacy (WEP) key, which is an encryption key for encrypting data;
an encoding section configured to encode the stored configuration information into two-dimensional codes; and
a display control section configured to control display of the two-dimensional codes.

13. A communication apparatus for performing a wireless communication, comprising:
an image-capture control section configured to control image capture of two-dimensional codes in which configuration information for rejecting displayed unauthorized connection and for connecting only an authorized party is encoded, the configuration information including a service set ID (SSID), which is an identifier for specifying a specific network in the wireless communication, and a wired equivalent privacy (WEP) key, which is an encryption key for encrypting data;

a decoding section configured to decode the image-captured two-dimensional codes into the configuration information; and a storage section configured to store the decoded configuration information.

14. A communication method for use with a communication apparatus for performing a wireless communication, the communication method comprising:

controlling the storage by a first apparatus of configuration information for rejecting unauthorized connection and for connecting only an authorized party to the first apparatus;

encoding the stored configuration information into two-dimensional codes by the first apparatus;

controlling display of the two-dimensional codes on a display of the first apparatus;

controlling image capture by a second apparatus of the two-dimensional codes displayed by the first apparatus in which the configuration information is encoded;

decoding by the second apparatus the image-captured two-dimensional codes into the configuration information; and controlling the storage by the second apparatus of the decoded configuration information.

* * * * *